United States Patent
Cuomo, Jr. et al.

(10) Patent No.: US 11,916,739 B2
(45) Date of Patent: Feb. 27, 2024

(54) MITIGATION OF PHYSICAL NETWORK MISCONFIGURATIONS FOR CLUSTERED NODES

(71) Applicant: MICROSOFT TECHNOLOGY LICENSING, LLC, Redmond, WA (US)

(72) Inventors: Daniel Frederick Cuomo, Jr., Woodinville, WA (US); Travis Luke, Camas, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/125,965

(22) Filed: Dec. 17, 2020

(65) Prior Publication Data

US 2022/0200860 A1 Jun. 23, 2022

(51) Int. Cl.
*H04L 41/0866* (2022.01)
*H04L 12/46* (2006.01)

(52) U.S. Cl.
CPC ...... *H04L 41/0866* (2013.01); *H04L 12/4641* (2013.01)

(58) Field of Classification Search
CPC .......... H04L 41/0866; H04L 41/0869; H04L 41/0873; H04L 12/4641; H04L 12/465
USPC ........................................................ 370/254
See application file for complete search history.

(56) References Cited

U.S. PATENT DOCUMENTS

| | | | |
|---|---|---|---|
| 6,061,334 A | 5/2000 | Berlovitch et al. | |
| 7,796,613 B2 | 9/2010 | Wackerly | |
| 8,417,788 B1 | 4/2013 | Ting et al. | |
| 8,462,666 B2 | 6/2013 | Subramanian et al. | |
| 8,462,774 B2 | 6/2013 | Page et al. | |
| 9,148,389 B2 | 9/2015 | Jacob Da Silva et al. | |
| 9,160,565 B2 | 10/2015 | Shukla | |
| 9,647,894 B2 | 5/2017 | Nair et al. | |
| 9,929,880 B2 | 3/2018 | Ganesan et al. | |
| 10,992,526 B1 | 4/2021 | Ali et al. | |
| 11,159,377 B2 | 10/2021 | Ramakrishnan | |
| 11,171,810 B1* | 11/2021 | Murray | H04L 12/4645 |
| 2008/0005329 A1* | 1/2008 | Bauman | H04L 61/50 709/226 |
| 2008/0270588 A1 | 10/2008 | Sultan et al. | |
| 2010/0313185 A1* | 12/2010 | Gupta | G06F 8/60 717/124 |

(Continued)

OTHER PUBLICATIONS

Kok, et al., "Simple IP subnet VLAN implementation", in Proceedings of Ninth IEEE International Conference on Networks, Oct. 10, 2001, pp. 160-165.

(Continued)

*Primary Examiner* — Cheikh T Ndiaye
*Assistant Examiner* — Ayele F Woldemariam
(74) *Attorney, Agent, or Firm* — Han Gim; Newport IP, LLC

(57) ABSTRACT

Techniques are disclosed for method for detecting misconfigurations and detecting incorrect cabling of physical adapters in a VLAN cluster. A Link Layer Discovery Protocol (LLDP) packet is received. Data is extracted identifying VLANs available on ports, and the MAC address of the switch. Incorrectly coupled adapters and misconfigured VLANs are identified.

17 Claims, 7 Drawing Sheets

(56) References Cited

U.S. PATENT DOCUMENTS

| | | | | |
|---|---|---|---|---|
| 2012/0294192 | A1* | 11/2012 | Masood | H04L 49/70 370/255 |
| 2015/0098474 | A1* | 4/2015 | Ganesan | H04L 12/467 370/395.53 |
| 2015/0277953 | A1* | 10/2015 | Xu | H04L 67/10 718/1 |
| 2015/0319042 | A1* | 11/2015 | PalChaudhuri | H04L 41/0873 370/395.53 |
| 2018/0316594 | A1 | 11/2018 | Wu et al. | |
| 2018/0351791 | A1* | 12/2018 | Nagarajan | H04L 41/0873 |
| 2020/0389477 | A1 | 12/2020 | Ambrosi et al. | |
| 2020/0412619 | A1 | 12/2020 | Nakamura et al. | |
| 2021/0096878 | A1 | 4/2021 | Chomakov et al. | |
| 2021/0243051 | A1* | 8/2021 | Wang | H04L 12/4633 |
| 2023/0239214 | A1 | 7/2023 | Cuomo, Jr. | |

OTHER PUBLICATIONS

U.S. Appl. No. 17/583,321, filed Jan. 25, 2022.
Risdianto, et al., "SmartX Box: Virtualized Hyper-Converged Resources for Building an Affordable Playground", in Journal of Electronics vol. 8, Issue 11, Oct. 30, 2019, 18 Pages.
Wiselman, et al., "Deploy a Storage Spaces Direct Hyper-Converged Cluster in VMM", Retrieved from: https://web.archive.org/web/20220102130647/https://docs.microsoft.com/en-us/system-center/vmm/s2d-hyper-converged?view=sc-vmm-2019, Sep. 21, 2021, 16 Pages.
"International Search Report and Written Opinion Issued in PCT Application No. PCT/US21/057470", dated Feb. 4, 2022, 11 Pages.
"International Search Report and Written Opinion Issued in PCT Application No. PCT/US22/050015", dated Feb. 28, 2023, 12 Pages.

* cited by examiner

MITIGATION OF PHYSICAL NETWORK MISCONFIGURATIONS FOR CLUSTERED NODES

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner.

When the data center experiences misconfiguration issues, poor network performance may result, resulting in lost data, or users being unable to provide quality services to their downstream customers, which may result in lost revenue and customer dissatisfaction. Troubleshooting misconfiguration issues may be difficult to perform given the complexity of the networks in data centers. Production loss and inefficiencies with respect to computing resources can be exacerbated when the data center is unable to quickly isolate and correct the cause of a misconfiguration issue. It is with respect to these considerations and others that the disclosure made herein is presented.

SUMMARY

The disclosed embodiments describe technologies for identifying configuration problems in a data center that can result in performance degradation. The configuration problems include misconfigured fabric virtual local area networks (VLANs) in a virtual machine (VM) cluster, and misconfigured physical network topologies in a VM cluster. In some embodiments, the disclosed techniques operate at the node-level, whereas most network tools focus on switches that have no visibility as to how switchports are being used.

Servers frequently use multiple physical NICs to provide fault tolerance of their workloads. Multiple VLANs can be carried over a single physical switchport. One problem that can occur is the inconsistent configuration of VLANs trunked on the switchports. This can cause packets to be dropped, which can be difficult to troubleshoot.

Another problem that can occur is the incorrect cabling of physical adapters to switchports. When this occurs, in order to access the other servers in a cluster, the adapters must cross the interlink between the switches, increasing the work for the switches and increasing network congestion leading to a higher likelihood of packet drops.

In some embodiments, a switch may transmit an IEEE 802.1AB Link Layer Discovery Protocol (LLDP) packet which defines an optional TLV (subtype 3) identifying the VLANs available on the switchport. The host may parse the packet for each network interface card (NIC) and compares the VLAN list advertised on each physical NIC to the other NICs. This could include multiple NICs in a team in which case there would need to be a packet received for each physical NIC in the team. Any deviation between physical adapters indicates a misconfiguration on the associated switch ports. At this point, a notification may be generated with actionable information to either fix the switch or modify applications from using that VLAN on the host. On the host, the list of VLANs in use by the application(s) may be retrieved and compared to the inconsistently configured list on the host. The misconfigured VLAN and VMs in use may be logged to a standard event channel. The LLDP packet information may be used to identify configuration discrepancies between the fabric and the physical NICs, physical NICs that are differently configured, virtual machines that are inconsistently configured from the fabric or NIC, and the like.

The VLAN comparison may be performed with other nodes in the cluster. A list of VLANs in use by applications on the host may be generated to ensure that none of the other hosts in the cluster have reported that one of those VLANs are missing. The process may be repeated on each node in the cluster. Any misconfigured VLANs may be identified in an alert.

Using native Key-Value Pair exchange, the data identified by the host may be provided to the VM. A service inside the VM may poll a registry location for the key value pair indicating the missing VLAN and the specific VLAN.

In some embodiments, a switch may transmit an IEEE 802.1AB LLDP packet which defines a mandatory TLV identifying the MAC address (ChassisID) of the switch. Adapters are separated by subnet and VLAN to identify adapters that should be able to transmit and receive data to one another. Each node in the cluster communicates to the other nodes to collect the ChassisID discovered for the adapter with the specific subnets and VLANs. The nodes group the Subnet/VLAN pairs by common ChassisID. If an adapter is connected to the ChassisID having the majority of the adapters in a specific Subnet/VLAN pair in the cluster, the adapter may be assumed to be configured correctly.

However, if the adapter reports a ChassisID for a subnet that is in the minority, the adapter may be identified as connected to a sub-optimal switch and a notification may be generated. The disclosed techniques may be particularly useful for hyper converged infrastructure scenarios.

The described techniques can allow for maintaining efficient use of computing resources such as processor cycles, memory, network bandwidth, and power, while reducing potential loss of data and services and downtime, resulting in impact to end users.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
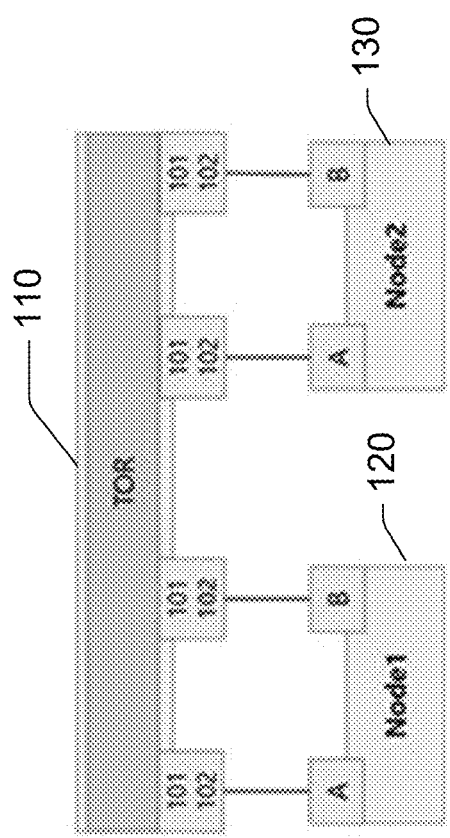
FIG. 1 is a diagram illustrating a VLAN misconfiguration in accordance with the present disclosure.

The disclosed embodiments describe technologies for data centers to diagnose misconfiguration issues, particularly misconfigured fabric VLANs and sub-optimal physical network topologies that may lead to poor network performance in the data center. This may allow data centers to more effectively adhere to operational objectives and at the same time improve operating efficiencies.

In many data centers, some misconfiguration issues may cause patterns of delays or drops of a percentage of data packets. Such issues can have a negative impact on performance and the user experience, and may be difficult to isolate. As traffic bandwidth increases and the data center scale grows, detecting and fixing misconfiguration issues are becoming even more important. At the same time, identifying such misconfiguration issues can be difficult, especially if the problem is silent and not reported in any data center counters. Moreover, packet losses might occur due to congestion instead of network equipment failures, making it more difficult to identify the misconfiguration issues. Unfocused attempts to collect troubleshooting data may result in a large amount of data that must be processed potentially without generating any actionable intelligence. End-to-end network diagnostics in a datacenter can thus be difficult and costly. There may be multiple routers/switches and end hosts involved, and it may be difficult to diagnose where and if any data loss is occurring.

With the complex topologies that are commonly implemented in data centers, there are multiple network paths and a number of devices/hops involved in any network communication. Any device/hop may drop packets intermittently. Troubleshooting such issues can be time consuming, error prone, and risky. It can also be labor-intensive as the network operator may need to access each and every device and enable packet capture. The data center can thus spend a considerable amount of time and effort attempting to isolate misconfiguration issues, which can lead to extensive and unnecessary consumption of computing resources.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

In various embodiments, technologies for identifying configuration problems in a data center are disclosed that can result in performance degradation. The configuration problems include misconfigured fabric virtual local area networks (VLANs) in a virtual machine (VM) cluster, and misconfigured physical network topologies in a VM cluster. Referring to the appended drawings, in which like numerals represent like elements throughout the several FIGURES, aspects of various technologies for mitigating misconfiguration issues will be described. In the following detailed description, references are made to the accompanying drawings that form a part hereof, and which are shown by way of illustration specific configurations or examples.

First, methods are described for mitigating misconfigured fabric VLANs in a cluster. Servers frequently use multiple physical NICs to ensure fault tolerance of their workloads. Particularly with virtualization hosts, the switchports connected to the physical NICs are configured in trunk mode which means that multiple VLANs can be carried over a single physical switchport. In some cases, network administrators can inconsistently configure the VLANs trunked on the switchports connected to the host team. This can cause the applications running on the host to have a network disconnection which can be difficult to troubleshoot. The disclosed techniques provide a way to detect this inconsistency, allowing for various administrators to be alerted and possibly auto-remediate the issue.

Referring to FIG. 1, illustrated is an example configuration with switch (e.g., ToR) 110 and node 1 120 and node 2 130. In this example, VLAN 102 is mistakenly omitted (as represented by the text in red) from one of the switchports. Servers typically do not detect this misconfiguration until the server administrator identifies that operation of a specific VLAN over a physical adapter is not possible and further contacts the network administrator to verify the hypothesis.

In virtualized environments that implement virtual machines and containers, the server administrators may be further abstracted from the network administrators. For example, an administrator may be in charge of VM1 using VLAN 102 and is currently running on Node 2 130. When VM1 migrates to Node1 120 and uses port B, network traffic does not flow.

This scenario can occur frequently as the administrator roles are disaggregated. The server administrator may simply place the other hosts in maintenance mode and VMs may be migrated to the "broken node." The application owner may report the outage and the server administrator may find that they have only modified the other nodes in the cluster, that the node has not been changed, and that other VMs are working on that node (unknowingly on port A).

This can be an extremely difficult operational issue to troubleshoot for administrators and can lead to large amounts of effort being expended to review group policy changes, firewall changes, and third-party application changes (e.g. antivirus). Additionally, the VM owner, server administrator, and network administrator may all be involved in troubleshooting, thus wasting significant resources on the issue.

In an embodiment, the following process may be implemented to address the issue. First, the switch may transmit an IEEE 802.1AB (Link Layer Discovery Protocol) packet which defines an optional TLV (subtype 3) identifying the VLANs available on the switchport. The host may parse the packet for each NIC in use and compare the VLAN list advertised on each physical NIC to the others. This could include multiple NICs in a team in which case there would need to be a packet received for each physical NIC in the team.

Inconsistently configured VLANs between NICs on the same host may be identified. Any deviation between physical adapters may indicate a misconfiguration on the associated switch ports. At this point, the host administrator can be alerted with actionable information to either fix the switch, or modify applications from using that VLAN on the host. The misconfigured data may be logged to a standard event channel.

The inconsistency list may be compared to list of in-use VLANs on the local host. On the host, the list of VLANs in use by the application(s) may be retrieved and that list may be compared to the inconsistently configured list on the host. For example, a host virtual NIC or vmNIC VLANs can be identified from the host and compared to the inconsistently configured list. The misconfigured VLAN and VMs in use may be logged to a standard event channel.

The inconsistency list on other hosts to the VLANs in use on the local host may be compared. The VLAN comparison may be performed to other nodes in the cluster. A list of VLANs in use by applications on host A may be obtained and it can be ensured that none of the other hosts in the cluster have reported that one of those VLANs are missing. The process may be repeated on each node in the cluster. The misconfigured VLANs may be provided to the administrator, as when the application migrates to the new host, the VLAN will fail.

The application owner of the problem inside the application may be alerted. In some embodiments, using native Key-Value Pair exchange, the identified data may be provided by the host to the VM. A service inside the VM may poll the standardized registry location for the key value pair indicating the missing VLAN and the specific VLAN. In scenarios where the VM administrator is separate from the server and network administrator, this can improve the speed of diagnostic recovery.

Second, methods are described for determining sub-optimal physical network topologies. In particular, a method for detecting the incorrect cabling of physical adapters to switchports is disclosed. Systems frequently use multiple adapters to provide network redundancy for important workloads, for example, storage traffic. These adapters are connected to different physical switches to reduce an additional single-point-of-failure.

Figure 2:
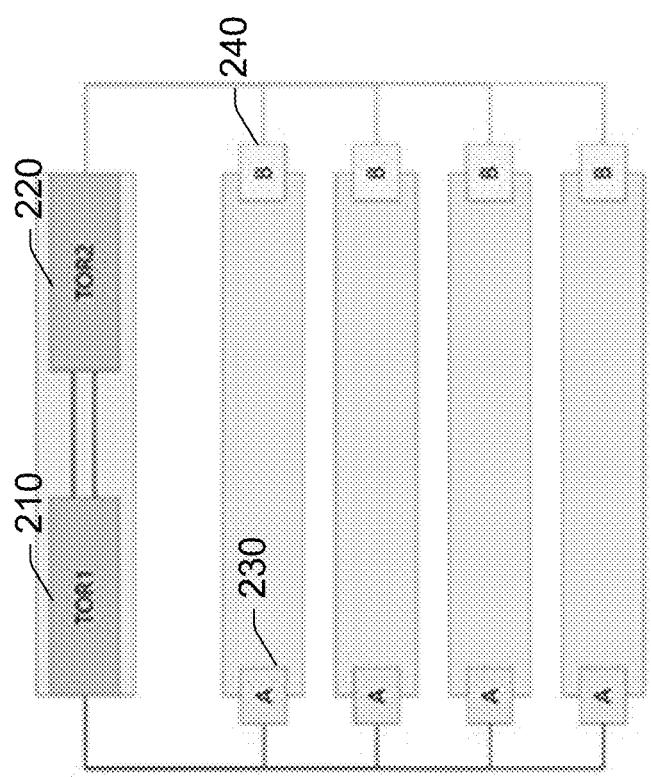
FIG. 2 is a diagram illustrating port misconfiguration in accordance with the present disclosure.

It would be desirable for cabling to isolate all traffic in the same subnet and VLAN to a single switch. This can help reduce traffic across an interlink (connection between two switches) which can be a chokepoint for network traffic. Referring to FIG. 2, illustrated are switch (ToR) 210 connected to subnet A 230, and switch (ToR) 220 connected to subnet B 240. Each server's adapter with subnet A 230 is attached to TOR1 210 while each server's adapter with subnet B 240 is attached to TOR2 220. No traffic crosses the links between TOR1 210 and TOR2 220. This can reduce network congestion and increase network efficiency.

Figure 3:
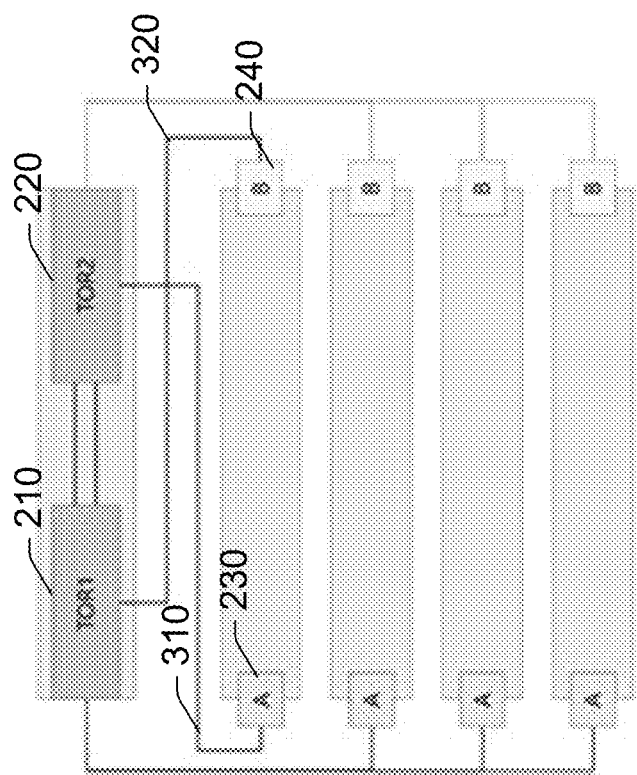
FIG. 3 is a diagram illustrating port misconfiguration in accordance with the present disclosure.

In some cases, network administrators can incorrectly cable one or more of the ports to the wrong TOR as shown in FIG. 3, where ToR 1 210 is cable to subnet B 240, and ToR 2 220 is cabled to subnet A 230. To get to the other servers in a cluster, the adapters must now cross the interlink between the TORs, increasing the work for the switches and network congestion leading to a higher likelihood of packet drops. Many datacenter operations are susceptible to network congestion and the removal of this congestion can increase the reliability of these operations.

In an embodiment, the switch may transmit an IEEE 802.1AB (Link Layer Discovery Protocol) packet which defines a mandatory TLV identifying the MAC address (ChassisID) of the switch. Adapters may be separated by subnet and VLAN to identify adapters that should be able to transmit and receive data to one another. Each node in the cluster may reach out to the other nodes to collect the ChassisID discovered for the adapter with the specific subnets and VLANs. Finally, the nodes may group the subnet/VLAN pairs by common ChassisID. If an adapter is connected to the ChassisID having the majority of the adapters in a specific subnet/VLAN pairs in the cluster, the adapter may be assumed to be configured correctly. However, if the adapter reports a ChassisID for a subnet that is in the minority, it can be identified as cabled to a sub-optimal switch and the system can alert the administrator to the problem.

Figure 4:
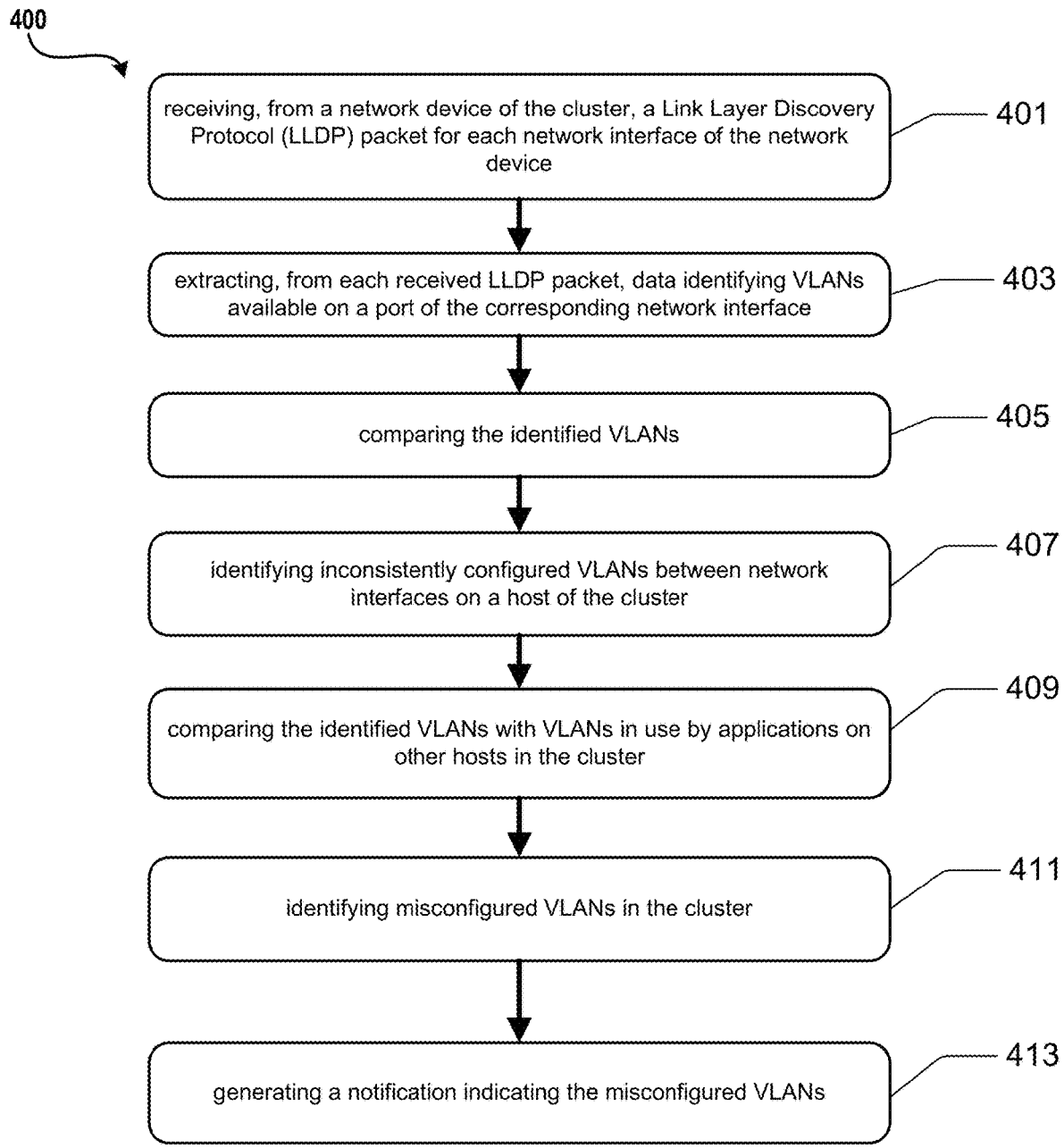
FIG. 4 is a flowchart depicting an example procedure for mitigating misconfigurations in accordance with the present disclosure.

Turning now to FIG. 4, illustrated is an example operational procedure for detecting misconfigurations in a cluster of virtualized local area networks (VLANs) of a computing environment in accordance with the present disclosure. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 401 illustrates receiving, from a network device of the cluster, a Link Layer Discovery Protocol (LLDP) packet for each network interface of the network device.

Operation 401 may be followed by operation 403. Operation 403 illustrates extracting, from each received LLDP packet, data identifying VLANs available on a port of the corresponding network interface.

Operation 403 may be followed by operation 405. Operation 405 illustrates comparing the identified VLANs.

Operation 405 may be followed by operation 407. Operation 407 illustrates identifying inconsistently configured VLANs between network interfaces on a host of the cluster.

Operation 407 may be followed by operation 409. Operation 409 illustrates comparing the identified VLANs with VLANs in use by applications on other hosts in the cluster.

Operation 409 may be followed by operation 411. Operation 411 illustrates based on the comparisons, identifying misconfigured VLANs in the cluster.

Operation 411 may be followed by operation 413. Operation 413 illustrates generating a notification indicating the misconfigured VLANs.

In an embodiment, the identifying inconsistently configured VLANs comprises identifying deviations between physical adapters.

In an embodiment, a notification of the deviations is generated.

In an embodiment, the comparing the identified VLANs with VLANs in use by applications comprises:
on the host, retrieving the list of VLANs in use by the applications and comparing the list to the inconsistently configured list on the host.

In an embodiment, the comparing the identified VLANs with VLANs in use by applications comprises:
obtaining a list of VLANs in use by applications on a first host and verifying that none of the other hosts in the cluster have reported that one of the listed VLANs are missing; and
repeating the verifying on each node in the cluster.

In an embodiment, the generating the notification comprises:
providing data indicative of the misconfigured VLANs using native Key-Value Pair exchange.

In an embodiment, the LLDP packet is a IEEE 802.1AB packet comprising type-length-value (TLV) structures.

In an embodiment, the misconfiguration is an omission of a VLAN from a network interface.

Figure 5:
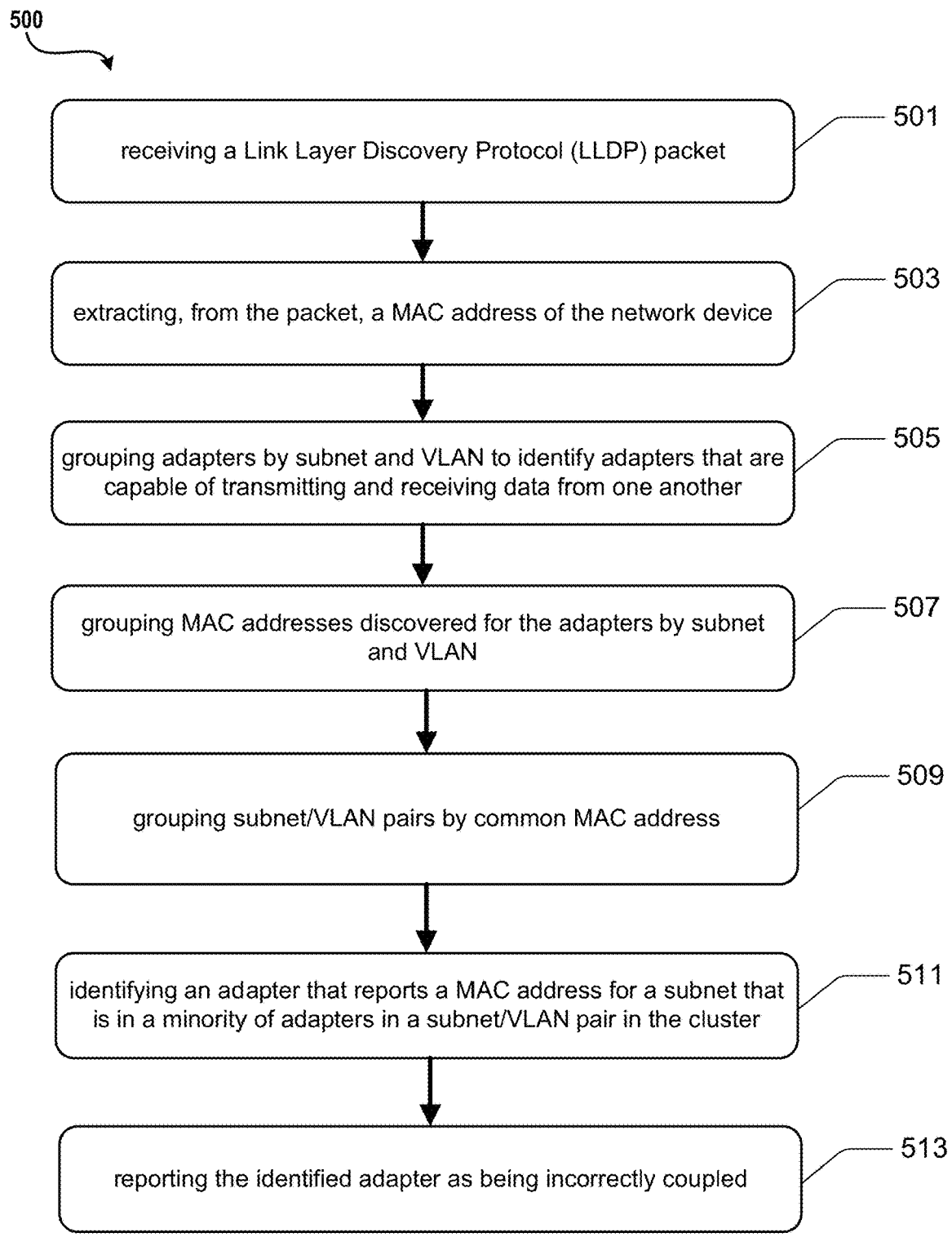
FIG. 5 is a flowchart depicting an example procedure for mitigating misconfigurations in accordance with the present disclosure.

Referring to FIG. 5, illustrated is an example operational procedure for detecting incorrect cabling of physical adapters in a VLAN cluster including one or more switches. The operational procedure may be implemented in a system comprising one or more computing devices. Referring to FIG. 5, operation 501 illustrates receiving, from a network device, a Link Layer Discovery Protocol (LLDP) packet.

Operation 501 may be followed by operation 503. Operation 503 illustrates extracting, from the packet, a MAC address of the network device.

Operation 503 may be followed by operation 505. Operation 505 illustrates grouping adapters by subnet and VLAN to identify adapters that are capable of transmitting and receiving data from one another.

Operation 505 may be followed by operation 507. Operation 507 illustrates grouping, by each host in the cluster, MAC addresses discovered for the adapters by subnet and VLAN.

Operation 507 may be followed by operation 509. Operation 509 illustrates identifying an adapter that reports a MAC address for a subnet that is in a minority of adapters in a subnet/VLAN pair in the cluster.

Operation 509 may be followed by operation 511. Operation 511 illustrates reporting the identified adapter as being incorrectly coupled.

In an embodiment, when an adapter is connected to a MAC address having a majority of the adapters in a specific subnet/VLAN pairs in the cluster, the adapter is statused as being configured correctly.

In an embodiment, the LLDP packet is a IEEE 802.1AB packet comprising type-length-value (TLV) structures.

In an embodiment, the LLDP packet comprises a mandatory TLV identifying the MAC address of the network device.

Figure 6:
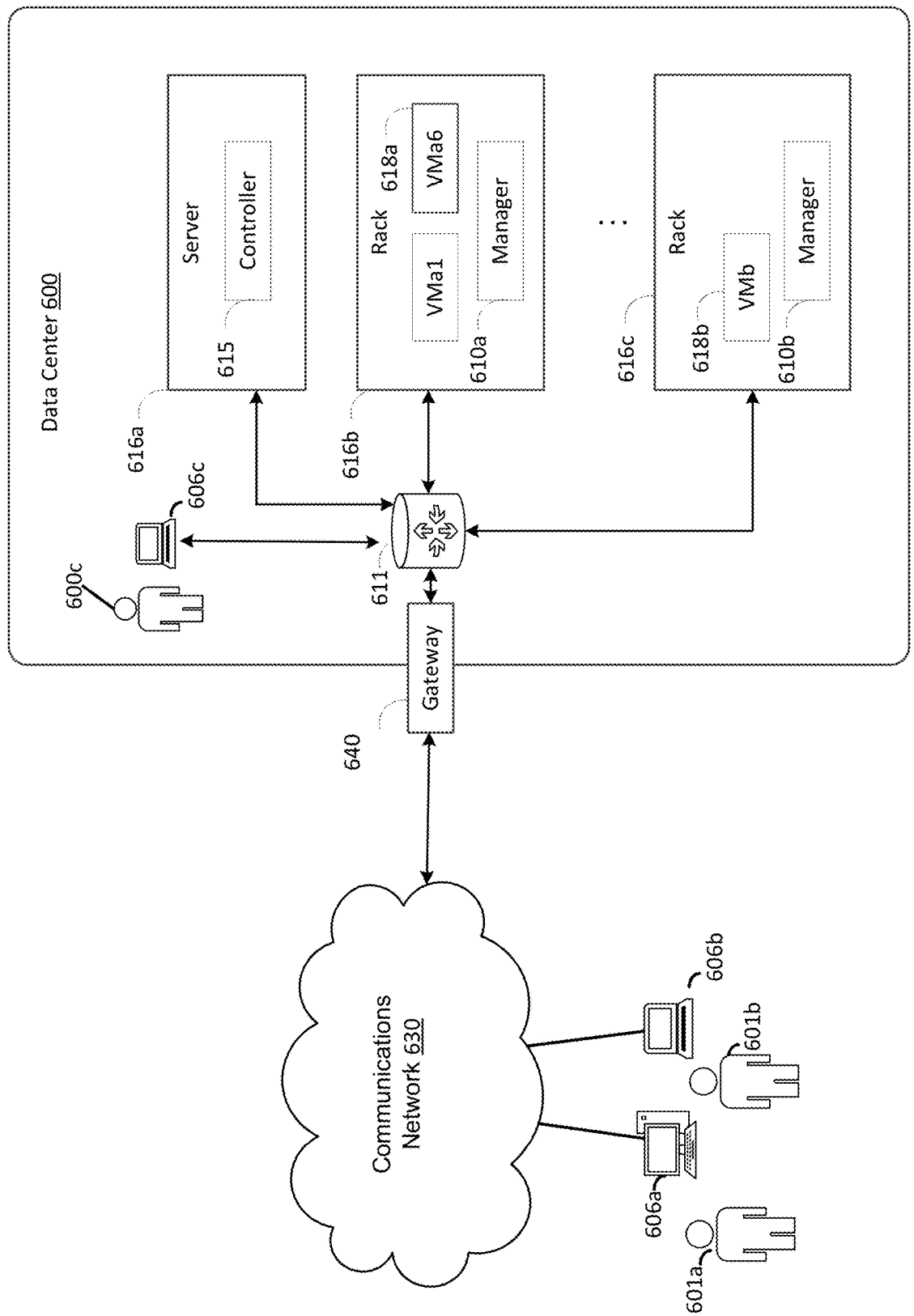
FIG. 6 is a diagram illustrating a data center for providing virtualized resources in accordance with the present disclosure.

FIG. 6 illustrates an example computing environment in which the embodiments described herein may be implemented. FIG. 6 illustrates a data center 600 that configured to provide computing resources to users 601a, 601b, or 601c (which may be referred herein singularly as "a user 601" or in the plural as "the users 601") via user computers 606a, 606b, and 606c (which may be referred herein singularly as "a computer 606" or in the plural as "the computers 606") via a communications network 630. The computing resources provided by the data center 600 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 600 may include servers 616a, 616b, and 616c (which may be referred to herein singularly as "a server 616" or in the plural as "the servers 616") that provide computing resources available as virtual machines 618a and 618b (which may be referred to herein singularly as "a virtual machine 618" or in the plural as "the virtual machines 618"). The virtual machines 618 may be configured to execute applications such as Web servers, application servers, media servers, database servers, and the like. Other resources that may be provided include data storage resources (not shown on FIG. 6) and may include file storage devices, block storage devices, and the like. Servers 616 may also execute functions that manage and control allocation of resources in the data center, such as a controller 615.

Controller 615 may be a fabric controller or another type of program configured to manage the allocation of virtual machines on servers 616.

Referring to FIG. 6, communications network 630 may, for example, be a publicly accessible network of linked networks and may be operated by various entities, such as the Internet. In other embodiments, communications network 630 may be a private network, such as a corporate network that is wholly or partially inaccessible to the public.

Communications network 630 may provide access to computers 606. Computers 606 may be computers utilized by users 600. Computer 606a,606b or 606c may be a server, a desktop or laptop personal computer, a tablet computer, a smartphone, a set-top box, or any other computing device capable of accessing data center 600. User computer 606a or 606b may connect directly to the Internet (e.g., via a cable modem). User computer 606c may be internal to the data center 600 and may connect directly to the resources in the data center 600 via internal networks. Although only three user computers 606a,606b, and 606c are depicted, it should be appreciated that there may be multiple user computers.

Computers 606 may also be utilized to configure aspects of the computing resources provided by data center 600. For example, data center 600 may provide a Web interface through which aspects of its operation may be configured through the use of a Web browser application program executing on user computer 606. Alternatively, a stand-alone application program executing on user computer 606 may be used to access an application programming interface (API) exposed by data center 600 for performing the configuration operations.

Servers 616 may be configured to provide the computing resources described above. One or more of the servers 616 may be configured to execute a manager 160a or 160b (which may be referred herein singularly as "a manager 160" or in the plural as "the managers 160") configured to execute the virtual machines. The managers 160 may be a virtual machine monitor (VMM), fabric controller, or another type of program configured to enable the execution of virtual machines 618 on servers 616, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 600 shown in FIG. 6, a router 611 may be utilized to interconnect the servers 616a and 616b. Router 611 may also be connected to gateway 640, which is connected to communications network 630. Router 611 may manage communications within networks in data center 600, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 600 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
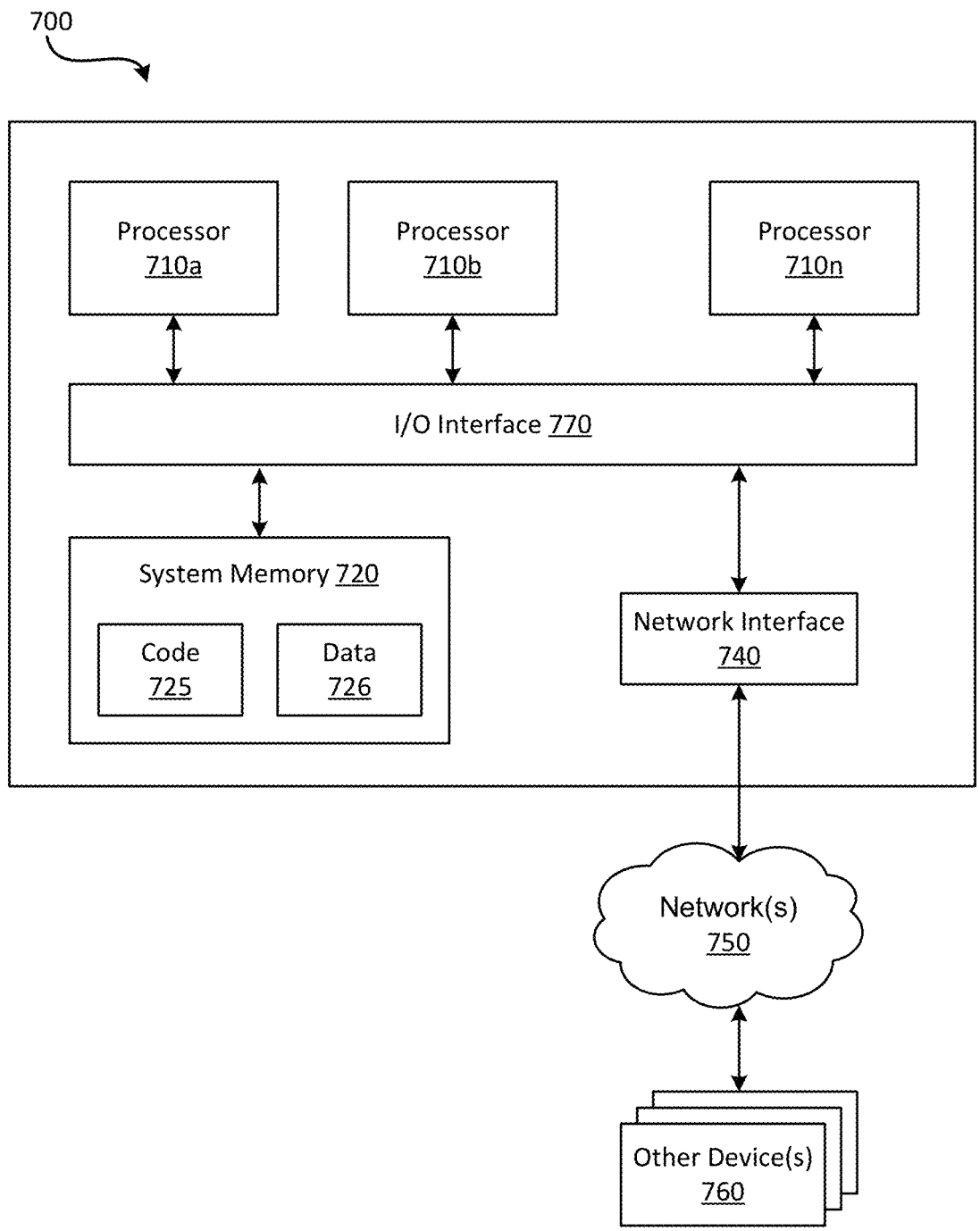
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 770. Computing device 700 further includes a network interface 740 coupled to I/O interface 770.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x76, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 770 may be configured to coordinate I/O traffic between the processor 710, system memory 720, and any peripheral devices in the device, including network interface 740 or other peripheral interfaces. In some embodiments, I/O interface 770 may perform any necessary protocol, timing, or other data transformations to convert data signals from one component (e.g., system memory 720) into a format suitable for use by another component (e.g., processor 710). In some embodiments, I/O interface 770 may include support for devices attached through various types of peripheral buses, such as a variant of the Peripheral Component Interconnect (PCI) bus standard or the Universal Serial Bus (USB) standard, for example. In some embodiments, the function of I/O interface 770 may be split into two or more separate components. Also, in some embodiments some or all of the functionality of I/O interface 770, such as an interface to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 770. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for detecting misconfigurations in a virtualized local area network (VLAN) cluster in a computing environment, the method comprising:
   receiving, from a network device of the cluster, a Link Layer Discovery Protocol (LLDP) packet for each network interface of the network device;
   parsing, from each received LLDP packet, data identifying VLANs available on each network interface;
   comparing the identified VLANs available on each network interface;
   based on the comparing of the identified VLANs, identifying inconsistently configured VLANs between the network interfaces;
   comparing the identified VLANs with VLANs in use by applications on hosts in the cluster by:
      identifying VLANs in use by applications on a first host and verifying that no other host in the cluster has reported that one of the identified VLANs is missing; and
      repeating the verifying for each node in the cluster;
   for each host in the cluster, based on the comparing of the identified VLANs and the inconsistently configured VLANs, marking a VLAN as misconfigured if other hosts in the cluster have reported the VLAN as missing; and
   generating a notification indicating the misconfigured VLANs.

2. The method of claim 1, further comprising identifying deviations between physical adapters.

3. The method of claim 2, further comprising generating a notification of the deviations.

4. The method of claim 1, wherein the comparing the identified VLANs with VLANs in use by applications comprises:
   on the host, retrieving a list of VLANs in use by the applications and comparing the list to the inconsistently configured VLANs.

5. The method of claim 1, wherein the generating the notification comprises:
   providing data indicative of the misconfigured VLANs using native Key-Value Pair exchange.

6. The method of claim 1, wherein the LLDP packet is a IEEE 802.1AB packet comprising type-length-value (TLV) structures.

7. The method of claim 1, wherein the misconfiguration is an omission of a VLAN from a network interface.

8. A method for detecting incorrect cabling of adapters in a VLAN cluster including one or more network devices, the method comprising:
   receiving, from network devices of the VLAN cluster, a Link Layer Discovery Protocol (LLDP) packet;
   parsing, from the received LLDP packets, MAC addresses of the network devices;
   grouping adapters of the network devices by subnet and VLAN to identify adapters that are capable of transmitting and receiving data from one another;
   for each host in the VLAN cluster, grouping MAC addresses for the adapters by subnet and VLAN;
   for each MAC address, identifying subnet/VLAN pairs;
   identifying adapters that report a MAC address for a subnet that is in a minority of the subnet/VLAN pairs for a given MAC address; and
   reporting the identified adapters as being incorrectly coupled, wherein an adapter reporting a MAC address associated with a majority of adapters in a given subnet/VLAN pair is statused as correctly coupled.

9. The method of claim 8, wherein the LLDP packet is a IEEE 802.1AB packet comprising type-length-value (TLV) structures.

10. The method of claim 8, wherein the LLDP packet comprises a mandatory TLV identifying the MAC address of the network device.

11. A system, comprising:
one or more processors; and
a memory in communication with the one or more processors, the memory having computer-readable instructions stored thereupon that, when executed by the one or more processors, cause the system to perform operations comprising:
receiving, from a network device of a computing environment implementing a cluster of virtualized local area networks (VLANs), a Link Layer Discovery Protocol (LLDP) packet for each network interface of the network device;
parsing, from each received LLDP packet, data identifying VLANs available on each network interface by:
identifying VLANs in use by applications on a first host and verifying that no other host in the cluster has reported that one of the identified VLANs is missing; and
repeating the verifying for each node in the cluster;
comparing the identified VLANs available on each network interface;
based on the comparing of the identified VLANs, identifying inconsistently configured VLANs between network interface cards (NICs);
comparing the identified VLANs with VLANs in use by applications on hosts in the cluster;
for each host in the cluster, based on the comparing of the identified VLANs and the inconsistently configured VLANs, marking a VLAN as misconfigured if other hosts in the cluster have reported the VLAN as missing; and
generate a notification of the misconfigured VLANs.

12. The system of claim 11, further comprising identifying deviations between physical adapters.

13. The system of claim 12, further comprising generating a notification of the deviations.

14. The system of claim 11, wherein the comparing the identified VLANs with VLANs in use by applications comprises:
on the host, retrieving a list of VLANs in use by the applications and comparing the list to the inconsistently configured VLANs.

15. The system of claim 11, wherein the generating the notification comprises:
providing data indicative of the misconfigured VLANs using native Key-Value Pair exchange.

16. The system of claim 11, wherein the LLDP packet is a IEEE 802.1AB packet comprising type-length-value (TLV) structures.

17. The system of claim 11, wherein the misconfiguration is an omission of a VLAN from a network interface.

\* \* \* \* \*